United States Patent Office 3,242,762
Patented Mar. 29, 1966

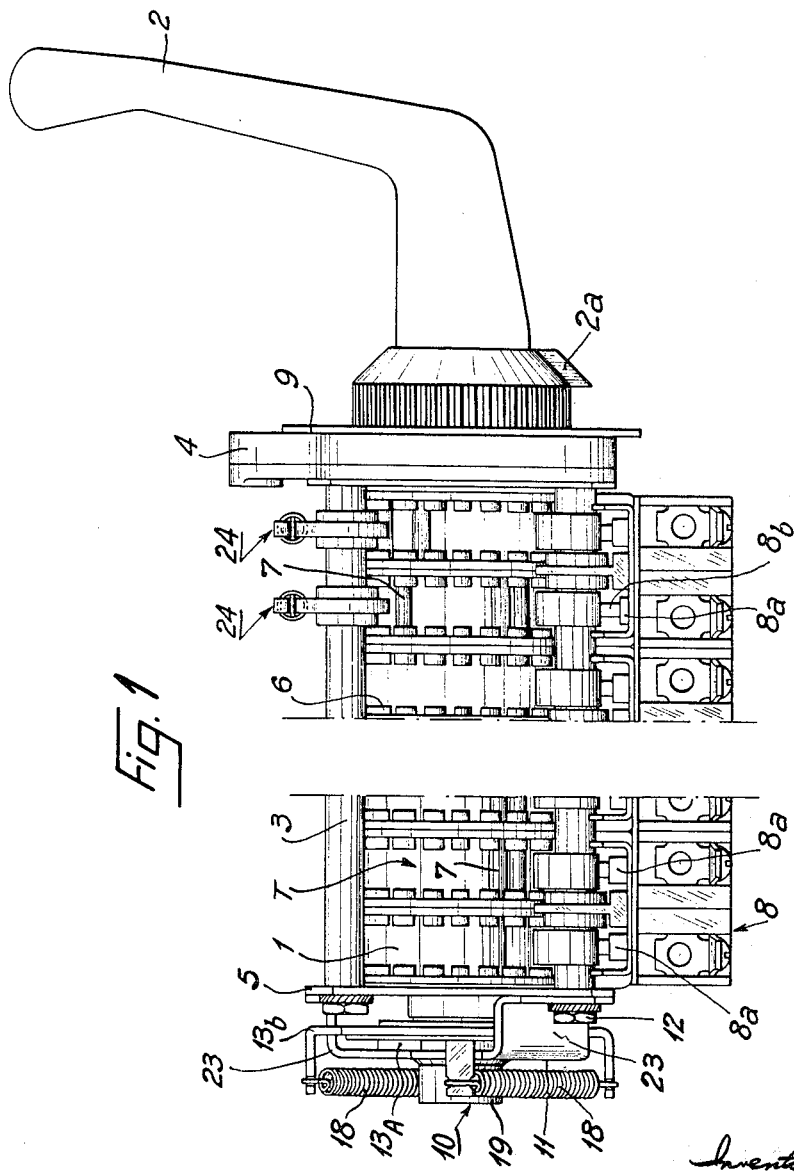

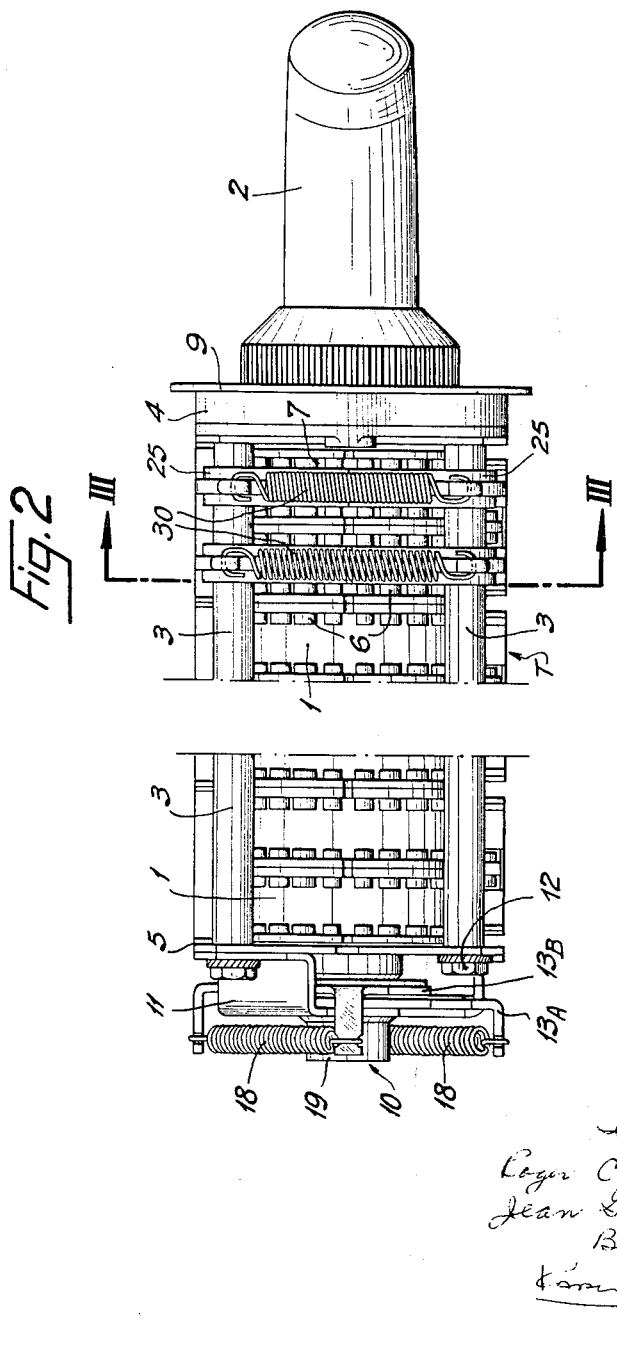

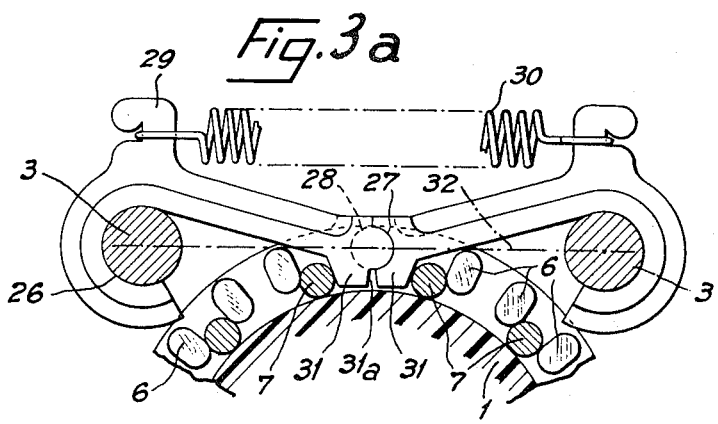
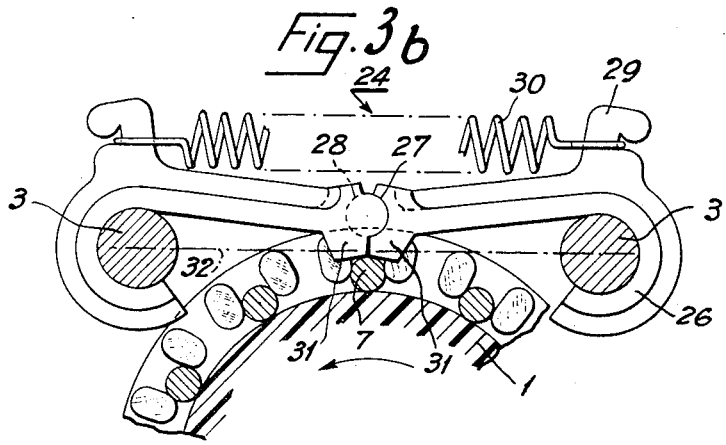
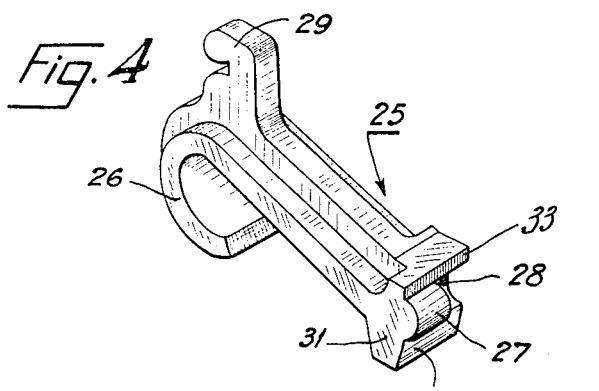

3,242,762
DETENT DEVICE FOR A ROTATABLE MEMBER IN ELECTRICAL SWITCHING EQUIPMENT AND THE LIKE
Roger C. Durand, Saint-Germain en Laye, and Jean G. Lafosse, Mareil-Marly, France, assignors to La Telemecanique Electrique, Nanterre, France, a company of France
Filed Dec. 15, 1964, Ser. No. 418,400
Claims priority, application France, Dec. 23, 1963, 958,233
7 Claims. (Cl. 74—527)

This invention relates to improved spring-detent device of a kind usable in connection with a manually rotatable member to develop a slight or moderate resilient resistance to the rotation of the member as the latter is moving past a prescribed angular position, so that an operator manually rotating the member can sense that such a position is being passed.

The device is especially useful in connection with electrical switching equipment such as multi-positional rotary controllers, and will be described with especial reference to this last application.

A known type of a multi-positional controller for manually controlling complex electrical apparatus comprises a camming drum mounted on a shaft for rotation by means of a manual lever or handle. The drum has a plurality of camming projections spaced axially and/or circumferentially of its periphery, the projections being desirably arranged to be selectively presettable at prescribed positions on the drum. A set of microswitches, connected in the circuitry of the electrical apparatus to be controlled, is arranged adjacent the drum, e.g. in a linear array parallel to a generatrix of the drum, so as to be actuated during rotation of the drum on engagement of a camming projection of the drum with an actuator element of a microswitch.

In such a rotary controller, there is one angular position of the drum which is a neutral position wherein, for example, all of the microswitches may be deactivated and the associated apparatus deenergized. Resilient means are generally provided for restraining the drum in this neutral position and returning it thereto on release of the control lever after the lever has been displaced in one or the other direction away from the neutral position.

Further, in such a rotary controller, it is often desirable to subdivide the full range of angular movement of the controller drum into a number of incremental arcs which may correspond to respective operating states or conditions of the controlled apparatus. Detent means are then provided whereby the drum, on rotating from one to an adjacent one of the arcuate divisions of its rotation, is subjected to moderate spring-resistance requiring the operator to exert a momentarily increased muscular effort and thus making the operator aware that he is about to switch from one to another operating condition.

The detent means heretofore used for this and analogous purposes have generally involved the presence of a polygonal cam secured to or forming part of the rotatable controller drum, and one or more spring-pressed detent levers engaging the periphery of the cam, e.g. by way of a roller. With such an arrangement, if a single detent lever is used, an undesirable assymmetrical condition is present in that the detent spring-latching force is not the same when the controller drum or other rotatable member is revolving in one or in the opposite direction. Usually therefore, two opposed and symmetrically positioned detent levers have been used on opposite sides of the cam, but the resulting arrangement is space-consuming and in some cases impractical because one side of the apparatus may be inaccessible.

It is an object of this invention to provide improved spring detent means of the type above referred to which will be entirely symmetrical in its action for both directions of rotation of a rotatable member with which it is associated, and which will be highly compact, as well as being simple, sturdy and inexpensive to make. An object is the provision of improved rotary switching equipment, such as multipositional rotary controllers for electrical equipment, embodying such detent means.

An exemplary embodiment of the invention will now be described with reference to the accompanying drawings, wherein:

FIGURE 1 is a side view of an electrical controller assembly embodying the invention.

FIGURE 2 is a corresponding view in overhead plan.

FIGURE 3a is a larger-scale view as seen on the line III—III, FIGURE 2, illustrating the spring detent means of the invention in idle position, that is, when not being cammed to exert a spring-force.

FIGURE 3b is a view similar to FIGURE 3a showing the detent means being cammed out to exert spring-force; and FIGURE 4 is a perspective view of one of the component detent levers of the improved device.

The rotary controller switch assembly generally illustrated in FIGURES 1 and 2 comprises a supporting frame in the form of a pair of end plates 4 and 5 and four spacer rods or posts 3 having ends engaging suitable holes formed in the corners of the end plates and retained in assembly therewith by means of screw 12.

A shaft, not visible in the drawings except for its extreme end portion 19 is arranged for rotation in coaxial openings formed in the end plates 4 and 5 and is formed with an extension 2 beyond end plate 4 in the form of a manual lever crank or handle for rotating the shaft.

Mounted on the shaft between end plates 4, 5 is a controller drum generally designated T and formed in this embodiment of the invention as a stack of identical spool-like elements 1 all assembled in juxtaposed relation along the shaft 19 for bodily rotation with said shaft when the handle 2 is turned one way or the other. The spool-like elements 1 are desirably made of a tough plastic material and each element comprises a cylindrical body and a pair of disk-like side flanges coaxial with the body and of larger diameter than it, as will be apparent from FIGURE 1. The inwardly directed surface of each of the side flanges of each spool-like element 1 has a series of oval bosses 6 projecting from it towards the other side flange.

Cylindrical camming pins 7 are adapted to be selectively inserted between pairs of adjacent bosses 6 so as to be removably retained between said bosses and the cylindrical surface of the body of the spool.

An array of identical microswitches 8 is supported from the end frame members 4, 5 of the assembly as by way of the flanged strips shown. Each microswitch 8, of generally conventional construction, has an actuator element 8a projecting from it. The actuator elements 8a of all the microswitches are aligned substantially parallel to a common generatrix of the drum T so as to be selectively depressible by the pins 7 of the respective drum elements 1, by way of intermediate levers or the like partly shown at 8b, when the drum T is rotated with handle 2.

In FIGURES 1 and 2 the controller switch assembly is illustrated in a neutral position, in which a pointer 2a associated with handle 2 is positioned in registry with a zero calibration of a suitable dial 9 associated with the assembly, this being the lowermost position of pointer 2a in the drawings. From this neutral position the handle 2 can be turned in either direction. It will be understood that the microswitches 8 are connected with the circuitry, not shown, of electrical apparatus to be controlled by means of the controller switch assembly. The camming pins 7 are preset at selected positions on the respective spool-like drum elements 1, in accordance with a prescribed programme. Actuation of the handle 2 will then serve to operate the electrical apparatus in accordance with the programmed sequence and with current operational requirements.

Means are provided for resiliently restraining the rotatable assembly including drum T, the shaft and handle 2 in its neutral position and returning it to that position when displaced in either direction from it. The said resilient means, generally designated 10, are disclosed in detail in co-pending application Serial No. 418,500, filed December 15, 1964, filed this same day, for "resilient return device for rotatable shafts in electric switching equipment and the like" and will not here be further described.

Further, improved detent means are provided for resiliently arresting or retarding the rotation of the drum T at each of a number of prescribed angular positions in order to make the operator aware that such a position has been reached in the manipulation of handle 2. The detent means, to be described in detail hereinafter, are generally designated 24 and are shown in FIGURE 1 as being associated with the last two spool elements 1 at the right-hand end of the stack constituting the drum T. Each detent assembly 24 comprises a pair of detent levers pivoted around the upper pair of the spacer posts 3 and cooperating with the camming pins 7 provided around said spool elements as earlier described.

As shown clearly in FIGURES 3a, 3b and 4, each lever, designated 25, is formed at its outer end with an arcuate hook section 26 partly surrounding a related one of the spacer posts 3 for pivotally supporting the lever on said post. Desirably the levers 25 are made from a tough, somewhat resilient plastic and the hook portions 26 have an arcuate extent somewhat greater than one half a circumference so as to enable them to be snapped into engagement around the related posts 3.

Each lever 24 at its inner end is shaped in a manner best seen from FIGURE 4. The inner end face of each lever, as shown, has a semi-cylindrical boss 27 followed by a complementary semi-cylindrical socket 28. The boss and the socket are reversely positioned as between the two levers 25, so that the bosses and sockets interfit as shown in FIGURES 3a and 3b. A nose 31 projects downwards from the inner end of each lever. The levers 25 further include, at their outer ends, upstanding anchoring projections 29, for the attachment of the opposite ends of an extension spring 30.

With the crooks 26 of the levers 25 engaging the respective support posts 3, and the bosses 27 and sockets 28 at their inner ends interfitted, as shown in FIGURE 3a, the action of extension spring 30 is to rotate both levers 25 downwards-inwards until mating flat end surfaces 33 provided as shown above the boss-and-socket formations of both levers abut as in FIGURE 3a. The arrangement is such that in this condition the centre of the pivot defined by said boss-and-socket formations and serving to interpivot both levers together at their inner ends, is in alignment with the centres of the rods 3 pivoting the outer ends of the levers, as indicated by the common alignment 32 in FIGURE 3a. Further, at this time, the forward surfaces 31a of the nose portions 31, diverge somewhat downwardly as shown, defining an inverted V between them. In this position moreover the combined width dimension of both noses 31 is somewhat less than the spacing between adjacent camming pins 7 around the circumference of the spool 1, so as to fit into the space between them, without however any danger of the levers being jammed in this position.

When the drum T including the spool 1 is rotated as earlier described, one or the other of the camming pins 7 positioned on opposite sides of the adjacent noses 31, depending on the direction of rotation imparted to the drum, cams the noses 31 upwards and rocks both levers in opposite directions about the posts 3 in opposition to the tension of spring 30, as indicated in FIGURE 3b, and thereafter allows the lever assembly to resume its initial or idle position.

It will be evident that owing to the symmetrical construction and arrangement described, and the interpivoted relation of both symmetrical detent levers at their inner ends, the extension spring 30 will operate under identical conditions regardless of the direction of rotation of the drum. Hence the spring resistance momentarily opposed to rotation will be the same for both directions.

In the arrangement shown in FIGURES 3a and 3b, it will be noted that the detent device of the invention is actuated to provide momentary spring resistance every time the drum T is rotated from one position to another without there being any intermediate range of free angular movement for the drum. This is because the adjacent camming pins 7 are shown as being circumferentially spaced amounts corresponding to the combined angular width of the lever noses 31 as mentioned above. However, this is clearly not essential and in fact FIGURE 1 shows other of the camming pins 7 spaced a larger distance apart around the circumference of the end spools 1 with which the detent devices are associated, such distances all being integral multiples of a modular distance which corresponds to the combined width of the noses 31 as indicated above.

In the raised or cammed position of the levers shown in FIGURE 3b, it will be seen that the centre of the boss-and-socket pivot means interpivoting the inner ends of the levers is raised above the alignment 32 of the rods 3, until the diverging lower mating surfaces 31a of the levers are in abutting engagement. This positively prevents the possiblity of a separation of the bosses 27 and sockets 28 and retains the levers in approximately interpivoted assembly at their inner ends. The closure of the V-shaped space initially present between the lower mating surfaces 31a also averts any risk of a camming pin 7 tending to be jammed therein by the pressure of spring 30 as the pin passes under the noses 31 in the position of FIGURE 3b. In order to ensure complete closure of the V-space, the angle formed between the faces 31a in the abutted condition of the upper mating faces 33 (as in FIGURE 3a) should be twice the angular displacement of each lever 25 about its outer pivot 3 between the lowered and raised positions of FIGURES 3a and 3b.

It will be understood that various changes may be made in the single embodiment described and shown without exceeding the terms of the ensuing claims.

What we claim is:

1. In a rotary electric switching apparatus including a rotatable member having a camming projection on its periphery, a spring detent device for momentarily opposing resilient resistance to the rotation of said member comprising:

two generally symmetrically related detent levers adjacent the periphery of the member and extending towards each other;

means pivoting the outer ends of the levers about respective axes parallel to the rotational axis of the member for limited rocking of both levers between a lowered position in which the inner ends of the levers are engageable with the periphery of the member and a raised position;

means on the inner ends of the lever interengaged to provide a pivot-like interconnection between the levers; and spring means interconnecting both levers to tend to rock same towards their lowered position, movement of a camming projection past said inner ends during rotation of the member in either direction about its said axis forcing both levers to rock towards their raised position in opposition to said spring means.

2. The combination defined in claim 1, wherein said interengageable means comprises complementary mating boss and socket formations on the inner end surfaces of the respective levers.

3. The combination defined in claim 1, wherein said spring means comprises an extension spring having opposite ends attached to the respective levers close to the outer ends thereof on the side remote from said rotatable member.

4. The combination defined in claim 1, wherein each lever at the inner end thereof has a nose projecting downwardly towards the periphery of the member, and above said nose a semi-cylindrical boss having its cylinder axis parallel to the axis of rotation of the member, and a semi-cylindrical socket complementary to said boss and coaxially aligned therewith, the bosses and sockets of the respective levers being interfitted to provide said pivot-like interconnection between the levers.

5. The combination defined in claim 4, wherein said levers have first mating flat end surfaces beneath said boss and socket formations thereof and second mating flat end surfaces above said boss and socket formations, the first and second end surfaces in each lever being so angularly related that the first end surfaces of the respective levers interengage in the lowered position of the levers and the second end surfaces thereof interengage in the raised position of the levers.

6. The combination defined in claim 4, wherein said rotatable member comprises a multipositional controller drum having means for selectively inserting camming pins at predeterminable locations around the drum periphery with the major dimension of said pins extending parallel to the axis of rotation of the drum, and wherein the angular spacing between adjacent pins is an integral multiple of the combined width of said noses.

7. The combination defined in claim 1, wherein the levers are moldings of a plastic material having some resiliency and the outer ends thereof are arcuately formed for resilient engagement around respective cylindrical pivots.

No references cited.

MILTON KAUFMAN, *Primary Examiner.*